(12) United States Patent
Bobrov et al.

(10) Patent No.: US 12,171,186 B2
(45) Date of Patent: Dec. 24, 2024

(54) AUTOMATIC MECHANICAL MANIFOLD VALVE FOR USE IN ROBOTIC MILKING SYSTEMS

(71) Applicant: AFIMILK AGRICULTURAL COOPERATIVE LTD., Kibbutz Afikim (IL)

(72) Inventors: Tzur Bobrov, Kinneret Kvutza (IL); Itamar Cohen, Givat Yoav (IL)

(73) Assignee: AFIMILK AGRICULTURAL COOPERATIVE LTD., Kibbutz Afikim (IL)

(*) Notice: Subject to any disclaimer, the term of this patent is extended or adjusted under 35 U.S.C. 154(b) by 549 days.

(21) Appl. No.: 17/395,409

(22) Filed: Aug. 5, 2021

(65) Prior Publication Data

US 2023/0015401 A1     Jan. 19, 2023

(30) Foreign Application Priority Data

Jul. 13, 2021  (IL) .......................................... 284842

(51) Int. Cl.
*A01J 5/04* (2006.01)
*A01J 5/007* (2006.01)

(52) U.S. Cl.
CPC ............. *A01J 5/048* (2013.01); *A01J 5/0075* (2013.01)

(58) Field of Classification Search
CPC ...................................................... A01J 5/048
USPC ... 119/14.05–14.7, 14.44, 14.47, 14.5, 14.51
See application file for complete search history.

(56) References Cited

U.S. PATENT DOCUMENTS

| | | | | |
|---|---|---|---|---|
| 1,182,215 A | * | 5/1916 | Schley et al. | A01J 5/04 119/14.44 |
| 1,813,238 A | * | 7/1931 | Cyrus | A01J 5/04 119/14.06 |
| 2,627,840 A | | 2/1953 | Mayer | |
| 5,141,403 A | * | 8/1992 | Guo | A01J 5/048 119/14.44 |
| 5,697,325 A | * | 12/1997 | Gehm | A01J 5/14 119/14.28 |
| 5,957,081 A | * | 9/1999 | van der Lely | A01J 9/00 119/14.09 |
| 6,079,359 A | * | 6/2000 | van den Berg | A01J 7/04 119/14.01 |
| 6,997,135 B1 | * | 2/2006 | DeWaard | A01J 7/02 119/14.08 |
| 7,957,920 B2 | * | 6/2011 | Innings | A01J 5/007 702/51 |

(Continued)

FOREIGN PATENT DOCUMENTS

| | | |
|---|---|---|
| DE | 91945 C | 10/1954 |
| EP | 2555609 A1 | 2/2017 |
| WO | 2014016840 A1 | 1/2014 |

OTHER PUBLICATIONS

Translation of DE919145 (Year: 1954).*

*Primary Examiner* — Morgan T Jordan
(74) *Attorney, Agent, or Firm* — The Roy Gross Law Firm, LLC; Roy Gross

(57) ABSTRACT

A mechanical manifold valve for robotic milking that is designed to operate at varying pressures, and which is operated automatically according to the pressure in at least one of the teat cups, such that the pressure in that teat cup influences the operation of the manifold valve, thereby controlling the pressure in at least one additional teat cup.

19 Claims, 5 Drawing Sheets

(56) References Cited

U.S. PATENT DOCUMENTS

| | | | | |
|---|---|---|---|---|
| 8,695,532 B2* | 4/2014 | Sandberg | ............... | A01J 5/048 |
| | | | | 119/14.02 |
| 2008/0022932 A1* | 1/2008 | Rottier | ............... | A01J 7/04 |
| | | | | 119/14.01 |
| 2009/0177418 A1* | 7/2009 | Innings | ............... | A01J 5/007 |
| | | | | 702/51 |
| 2012/0298042 A1* | 11/2012 | Hofman | ............... | A01J 5/0135 |
| | | | | 119/14.08 |
| 2014/0245958 A1 | 9/2014 | Hofman et al. | | |
| 2015/0173320 A1* | 6/2015 | Balkenhol | ............... | A01J 7/00 |
| | | | | 137/862 |
| 2015/0196003 A1* | 7/2015 | Brayer | ............... | A01J 5/007 |
| | | | | 119/14.08 |
| 2015/0201577 A1* | 7/2015 | Duke | ............... | A01J 7/04 |
| | | | | 119/14.47 |
| 2018/0235173 A1* | 8/2018 | Torgerson | ............... | A01J 7/04 |
| 2019/0141942 A1* | 5/2019 | Wallace | ............... | A01J 5/0075 |
| | | | | 119/14.38 |
| 2023/0117201 A1* | 4/2023 | Torgerson | ............... | A01J 7/04 |
| | | | | 119/14.47 |

\* cited by examiner

AUTOMATIC MECHANICAL MANIFOLD VALVE FOR USE IN ROBOTIC MILKING SYSTEMS

CROSS REFERENCE TO RELATED APPLICATIONS

This application claims the benefit of priority of Israel Patent Application No. 284842 filed on Jul. 13, 2021, the contents of which are all incorporated herein by reference in their entirety.

FIELD OF THE INVENTION

The present invention is directed to an automatic mechanical manifold valve. In particular, the present invention is directed to an automatic mechanical manifold valve that is coupled to at least two separate milk lines, each separately attached to one teat cup, such that the automatic mechanical manifold valve of the present invention is operated by the pressure in at least one of the teat cups, thereby controlling the pressure in at least one other teat cup that is connected to the valve.

BACKGROUND OF THE INVENTION

Typically, the teat cup has a flexible inner liner and an inflexible outer shell. The teat cup operates to create a milking action by alternately reducing and increasing the pressure between the liner and the shell, i.e., outside the liner, while a constant reduced pressure is maintained between the liner and the teat, i.e., inside the liner. This formed alternating pressure within the teat cup, in essence, "messages" the animal's teat and enhances the flow of milk. The alternating pressure between the liner and the shell is generally adjusted by a vacuum producing source.

When the system is operated, e.g., prior to the attachment of the teat cups to the teats, or when a teat cup becomes loose and disengages from the teat, the constant reduced pressure between the liner and the teat may cause air and contaminations to be sucked into the system, thereby causing turbulation and contaminating the milk. Accordingly, a valve is typically placed along the milk line between each teat cup and the manifold, ensuring that if there is a pressure drop in a specific teat cup, e.g., in view of poor attachment to the teat, or prior to full attachment, that specific teat cup will essentially be disconnected from the system, such that air and contaminations will not enter the manifold or the milk.

Such valves may be manual or automatic, wherein automatic valves are generally known to be advantageous, since the automatic reaction time is shorter and since they do not require an operator to be onsite, operating each and every necessary valve. On the other hand, automatic valves, which are electronic, have various disadvantages, such as malfunctions when the teat cups are not vertical to the milking platform, as well as requirements for electronic activators or controllers in order to operate the valve, and delicate electronic elements, that may malfunction. In addition, and the requirement of the system to have a valve for each teat cup causes the manifold to be both costly and cumbersome. Further, generally manifold valves operate at a specific predefined pressure that cannot be changed.

Accordingly, there is a need in the art for a mechanical manifold valve that will operate automatically, will not require an activator or controller, will not be dependent on electronic elements, and that may be changed to operate at various predefined pressures, according to the system requirements.

SUMMARY OF EMBODIMENTS OF THE INVENTION

Some embodiments of the invention are directed to an automatic mechanical manifold valve having an opened configuration and a closed configuration,
   wherein the automatic mechanical manifold valve is coupled to a first group of teat cups and to a second group of teat cups; and
   wherein the first group of teat cups and the second group of teat cups are each coupled to:
     a main milk line; and
     a vacuum system creating pressure in each of the teat cups of the first group of teat cups and in each of the teat cups of the second group of teat cups; and
   wherein the manifold valve is set:
     to the closed configuration when the pressure in the first group of teat cups is above a predefined pressure value; or
     to the opened configuration when the pressure in the first group of teat cups is below the predefined pressure value; and
   wherein
     when the manifold valve is in the closed configuration, the second group of teat cups is essentially disconnected from the main milk line, such that matter cannot flow from the teat cups of the second group of teat cups into the main milk line; and
     when the manifold valve is in the opened configuration, the second group of teat cups is essentially connected to the main milk line, allowing the flow of milk from the teat cups of the second group of teat cups to the main milk line.

According to some embodiments, the first group of teat cups comprises one teat cup. According to some embodiments, the second group of teat cups comprises one teat cup.

According to some embodiments, the second group of teat cups is coupled to the main milk line indirectly, via the automatic mechanical manifold valve. According to some embodiments, the first group of teat cups is coupled to the main milk line directly, not via the automatic mechanical manifold valve.

According to some embodiments, the automatic mechanical manifold valve comprises:
   a spring;
   a diaphragm;
   a pin;
   a covering element; and
   a vacuum chamber;
   wherein
   the pin is coupled to the spring, the diaphragm and the covering element;
   the diaphragm is further coupled to the vacuum chamber; and wherein in the closed configuration the covering element covers a passage to the main milk line and wherein in the opened configuration the covering element at least partially does not cover the passage to the main milk line.

According to some embodiments, pin and the covering element are combined in a single pin-covering element.

According to some embodiments, the tension of the spring is adjustable. According to some embodiments, the spring is a variable stiffness spring, a compression spring, an extension spring, or a reset spring.

According to some embodiments, a vacuum in the vacuum chamber exerts a force on the diaphragm, and wherein the spring exerts a counterforce on the pin, which, in turn exerts the counterforce on the diaphragm, such that a balance between the force and the counterforce determines the position of the pin, which in turn determines the position of the covering element in respect to the passage to the main milk line.

According to some embodiments, the covering element is a ball-shaped element, a sphere-shaped element, block-shaped element, or a shutter. According to some embodiments, the covering element is a ball-shaped element.

According to some embodiments, the predefined pressure value is variable. According to some embodiments, the predefined pressure value is varied mechanically. According to some embodiments, the predefined pressure value is varied electronically.

Some embodiments of the invention are directed to a teat cup assembly comprising a first group of teat of teat cups, a second group of teat cups, and an automatic mechanical manifold valve,
  wherein the automatic mechanical manifold valve has a closed configuration and an opened configuration;
  wherein a pressure in the first group of teat cups, or in a chamber coupled to the first group of teat cups, controls the automatic mechanical manifold valve, determining whether the automatic mechanical manifold valve is in the closed configuration or the opened configuration; and
  wherein the automatic mechanical manifold valve controls flow from the second group of teat cups to a main milk line, such that in the closed configuration the flow from the second group of teat cups to the main milk line is essentially blocked, while in the opened configuration the flow from the second group of teat cups to the main milk line is essentially free.

According to some embodiments, the automatic mechanical manifold valve is
  in the closed configuration when the pressure is above a predefined pressure value; and
  in the opened configuration when the pressure is below a predefined pressure value.

According to some embodiments, the first group of teat cups comprises one teat cup. According to some embodiments, the second group of teat cups comprises one teat cup.

According to some embodiments, the automatic mechanical manifold valve comprises:
  a spring;
  a diaphragm;
  a pin;
  a covering element; and
  a vacuum chamber;
  wherein
  the pin is coupled to the spring, the diaphragm and the covering element;
  the diaphragm is further coupled to the vacuum chamber; and wherein in the closed configuration the covering element covers a passage to the main milk line and wherein in the opened configuration the covering element at least partially does not cover the passage to the main milk line.

According to some embodiments, the pin and the covering element are combined in a single pin-covering element.

According to some embodiments, the tension of the spring is adjustable. According to some embodiments, the spring is a variable stiffness spring, a compression spring, an extension spring, or a reset spring.

According to some embodiments, the covering element is a ball-shaped element, a sphere-shaped element, block-shaped element, or a shutter. According to some embodiments, the covering element is a ball-shaped element.

According to some embodiments, the predefined pressure value is variable. According to some embodiments, the predefined pressure value is varied mechanically. According to some embodiments, the predefined pressure value is varied electronically.

Further embodiments of the invention are directed to a method for controlling milk flow from a second group of teat cups to a main milk line, via an automatic mechanical manifold valve, by a pressure in a first group of teat cups or in a vacuum chamber coupled to the first group of teat cups,
  wherein when the pressure is above a predefined pressure value, the automatic mechanical manifold valve is in a closed configuration, such that matter is essentially blocked from flowing from the second group of teat cups to the main milk line; and
  wherein when the pressure is below a predefined pressure value, the automatic mechanical manifold valve is in an opened configuration, such that matter is essentially free to flow from the second group of teat cups to the main milk line.

According to some embodiments, the first group of teat cups comprises one teat cup. According to some embodiments, the second group of teat cups comprises one teat cup.

According to some embodiments, the automatic mechanical manifold valve comprises:
  a spring;
  a diaphragm;
  a pin;
  a covering element; and
  a vacuum chamber;
  wherein
  the pin is coupled to the spring, the diaphragm and the covering element;
  the diaphragm is further coupled to the vacuum chamber;
  and wherein in the closed configuration the covering element covers a passage to the main milk line and wherein in the opened configuration the covering element at least partially does not cover the passage to the main milk line.

According to some embodiments, a vacuum in the vacuum chamber exerts a force on the diaphragm, and wherein the spring exerts a counterforce on the pin, which, in turn exerts the counterforce on the diaphragm, such that a balance between the force and the counterforce determines the movement and final position of the pin, which in turn determines the position of the covering element in respect to the passage to the main milk line.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanied drawings. Embodiments of the invention are illustrated by way of example and not limitation in the figures of the accompanying drawings, in which like reference numerals indicate corresponding, analogous or similar elements, and in which:

FIGS. 4A and 4B present an approximately 45 degree view of system 100, in respect to the systems presented in FIGS. 1A, 1B, 2A, 2B and 3, including manifold valve 200, wherein FIG. 4A presents the outside view of the system, and FIG. 4B presents a partial cross sectional view (where approximately a 90 degree "wedge" has been "removed" from the system, allowing an inside view thereof).

Figure 1A:
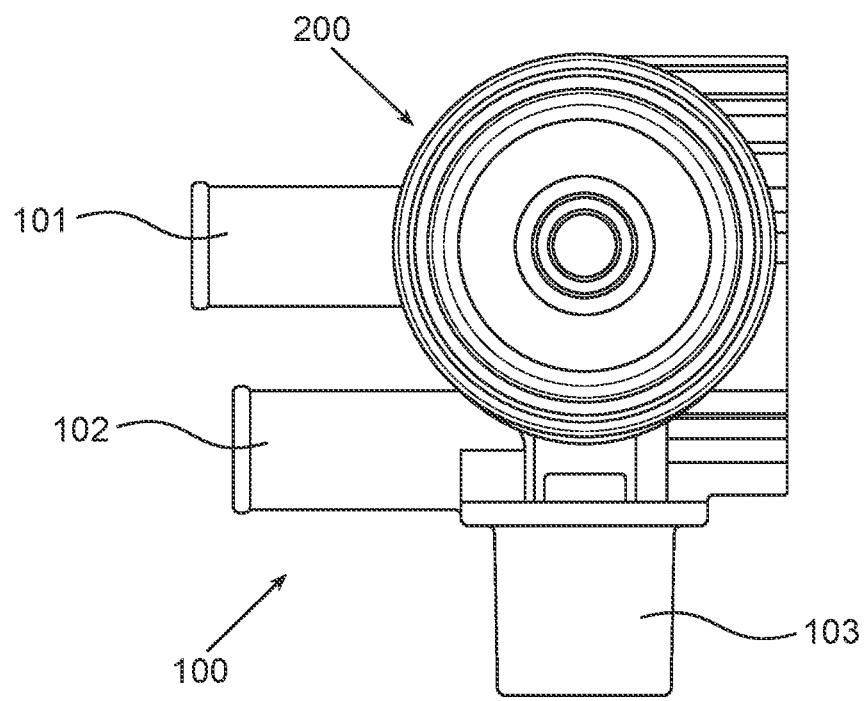
FIG. 1A presents an outside side view of an embodiment of the milking manifold valve coupled to three milk tubes—one leading to the main milk line and two others each leading to a teat cup.

It will be appreciated that for simplicity and clarity of illustration, elements shown in the figures have not necessarily been drawn accurately or to scale. For example, the dimensions of some of the elements may be exaggerated relative to other elements for clarity, or several physical components may be included in one functional block or element. Further, where considered appropriate, reference numerals may be repeated among the figures to indicate corresponding or analogous elements.

DETAILED DESCRIPTION OF EMBODIMENTS OF THE INVENTION

It is noted that throughout this document, the term "about" is intended to cover ±10% of the disclosed value. It is further noted that throughout this document, the terms computer system and central computer system are interchangeable and refer to any computerized system that may receive data, store data, perform calculations, and the like. For instance, the computer system, or the centralized computer system, may be a smartphone, a laptop, a tablet, a PC, a dedicated computerized system in the milk farm, a remote dedicated computerized system or the like. Further, even where one computer system is mentioned, this is meant to additionally refer to several computerized systems connected to one another, such that, e.g., alerts may be sent to one system, e.g., a user's smartphone, while calculation are performed on a second system, e.g., a dedicated computerized system in the milk farm or remote thereto.

Although embodiments of the invention are not limited in this regard, the terms "plurality" and "a plurality" as used herein may include, for example, "multiple" or "two or more". The terms "plurality" or "a plurality" may be used throughout the specification to describe two or more components, devices, elements, units, parameters, or the like. Although embodiments of the invention are not limited in this regard, the term "set" when used herein may include one or more items.

It is noted that throughout this document, unless specifically mentioned otherwise, the terms "teat cups", "milking cups" and the like, are interchangeable. It is noted that throughout, term such as "vertical upright holder", "vertical upright teat cup holder", "upright holder", and the like, are interchangeable unless specifically mentioned otherwise or unless a person skilled in the art would understand that any one of those terms has a different and/or broader definition than the other. In this respect it is noted that the vertical upright teat cup holders are defined herein to hold teat cups that are directly connected to the main milk-line; however, other than being connected to the main milk-line, the teat cups held in the vertical upright teat cup holder are not connected to any robotic arm or the like. It is noted that the teat cups may be held/gripped by a robotic arm of the mobile unit; however, they are not connected thereto.

It is noted that the "system" referred to herein may also be referred to as a "milking system", a "teat cup assembly" and any other appropriate term.

In addition, it is noted that, unless specifically mentioned otherwise, or unless would have been understood otherwise by a person skilled in the art, the term "mechanical manifold valve" is interchangeable with "mechanical milking valve", "mechanical milking manifold valve", "automatic manifold valve", "automatic mechanical manifold valve", "automatic mechanical manifold milking valve", "robotic manifold valve", or simply "manifold valve", "valve", and the like.

It is further emphasized that the term "main milk line", as used herein, refers to the milk line leading from various points in the milking parlor to the milking parlor's milk tank, referred to also as the main milk tank. Any portion of the "main milk line" may be referred to herein as the "milk line", "tube", "milk tube", or the like, wherein this may be even a short section of the main milk line, leading, e.g., from each teat cup to the milking manifold.

Although dairy livestock (and in particular, cows) are mainly discussed herein, it will be understood that embodiments of the invention may be applicable to any type of livestock (e.g., goats, sheep, horses etc.). Particularly, even when cows are specifically related to, the embodiments are intended to cover any other type of livestock as well.

It is further noted that while generally the manifold valve referred to herein are in the context of robotic milking manifold valves, the same valves may be used in any appropriate system, e.g., air systems or sequence systems. Further, while robotic milking systems are mainly referred to herein, the manifold valves of the invention could be used in any appropriate milking system.

Embodiments of the invention are directed to an automatic mechanical manifold valve connected to a plurality of teat cups, wherein the automatic mechanical manifold valve has an opened configuration and a closed configuration and is automatically operated, i.e., changed from the opened configuration to the closed configuration, and vice versa, according to the pressure in at least one of the teat cups in the plurality of teat cups, such that when the pressure in the at least one teat cup is above a predefined value, the manifold valve is automatically moved to the closed configuration, thereby disconnecting the remaining teat cups from the main milk line. It is noted that throughout this document, unless specifically mentioned or understood otherwise, a pressure above a predefined value is equivalent to a vacuum level lower than that predefined value, and vice versa.

The manifold valve of the invention has an opened and closed configuration and is connected to a plurality of teat cups, wherein the plurality of teat cups includes a first group of teat cups and a second group of teat cups, and wherein each one of the first group of teat cups and the second group of teat cups includes at least one teat cup. Further, the pressure in the first group of teat cups causes the manifold valve to change from the opened configuration to the closed configuration, and vice versa, wherein a pressure in the first group of teat cups that is above a predefined value causes the manifold valve to be set at the closed configuration, while a pressure in the first group of teat cups that is below a predefined value, causes the manifold valve to be set at the opened configuration. When the manifold valve is closed, the second group of teat cups is essentially disconnected from the main milk line, such that practically no matter, including milk, air, contaminations, or the like, passes from the second group of teat cups into the main milk line, via the milking manifold. In contrast, when the manifold valve is opened, the second group of teat cups is connected to the main milk line, such that milk may flow from the second group of teat cups, via the milking manifold, to the main milk line. Thus, essentially, the pressure in the first group of teat cups controls the flow in the second group of teat cups. In this respect it is noted that the flow in the first group of teat cups may be controlled, e.g., by coupling those teat cups to any appropriate type of sensor. Such a sensor may, e.g., detect a pressure increase in the first group of teat cups, causing, e.g., a shutter to close, causing a vacuum valve to close, notifying a human operator or any type of system, and the like, such that flow is essentially stopped, automatically or by human intervention, in the first group of teat cups, such that practically no matter, including milk, air, contaminations, or the like, passes from the first group of teat cups into the main milk line, via the milking manifold. It is noted that once the flow in the first group of teat cups is stopped, the pressure may be raised to above the predefined value, as detailed above, thereby changing the manifold valve to the closed configuration and stopping the flow in the second group of teat cups as well.

According to some embodiments, the first group of teat cup comprises only one teat cup, referred to herein as a first teat cup, and the second group of teat cups comprises only one teat cup, referred to herein as a second teat cup. According to such an embodiment, the automatic mechanical manifold valve is coupled to a first teat cup and a second teat cup, wherein both the first teat cup and the second teat cup are coupled to the main milk line and to a vacuum system creating low pressure in each of the first teat cup and the second teat cup. Further, before the vacuum builds up, i.e., when the pressure in the first teat cup is above a predefined value, the valve is automatically set to the closed configuration, thereby essentially disconnecting the second teat cup from the main milk line, that is, not allowing the flow of matter from the second teat cup into the main milk line. In contrast, when the pressure in the first teat cup is below the predefined value, i.e., vacuum has built up, the valve is automatically set to the opened configuration, thereby allowing flow of milk from the second teat cup into the main milk line.

It is noted that the operation of the valve, i.e., moving between the closed and opened configurations, is, according to some embodiments, a mechanical type of operation, not electronic or the like, wherein the pressure in the first group of teat cups, or the first teat cup, operates the valve, and wherein the operation of the valve essentially controls the flow in the second group of teat cups of second teat cup, such that when the valve is closed matter essentially cannot flow from the second group of teat cups (or the second teat cup) to the main milk line, and when the valve is opened matter can flow from the second group of teat cups (or the second teat cup) to the main milk line. Thus, the automatic manifold valve of the invention is such that its mechanical operation is determined according to the pressure in a first, or a first group of, teat cups, and controls the flow in a second, or second group of, teat cup. Therefore, in a system in which the valve of the invention is used, the pressure in a first, or first group of, teat cups essentially determined the flow in a second, or second group of, teat cups.

The value of pressure in the first, or first group of, teat cups that determines whether the valve is in the closed configuration or in the opened configuration is referred to herein as the "predefined pressure", "predefined pressure value", "predefined value", "predefined operation pressure", "predefined valve operating pressure", "operating pressure", and the like. According to some embodiments, the predefined operation pressure is constant. According to other embodiments, the predefined operation pressure is variable. According to some embodiments, the variance in the predefined operation pressure is achieved mechanically. According to some embodiments, the variance in the predefined operation pressure is achieved electronically. According to some embodiments, a human operator may set the predefined operation pressure, according to, e.g., the needs or setup of the system. According to other embodiments, a sensor may be coupled to the valve, such that data received, e.g., pressure values, causes a variation in the predefined operation pressure.

Variation in the predefined operation pressure may be performed prior to the setup of the system and/or at any time point during the operation of the system, e.g., according to values received from a sensor, according to needs detected by human operators, and the like.

Reference is now made to FIG. 1A presenting a side view of system 100 including two milk tubes 101 and 102 each coupled on one end to a teat cup (not shown) and on the other end, via manifold valved 200 and milk tube 103 to the main milk line (not shown). Although not shown it should be understood that each one of milk tubes 101 and 102 is connected to a teat cup, such that when an animal is milked, milk from each of those teat cups flows via tubes 101 and 102 to the main milk line via manifold valve 200 and milk tube 103.

Figure 1B:
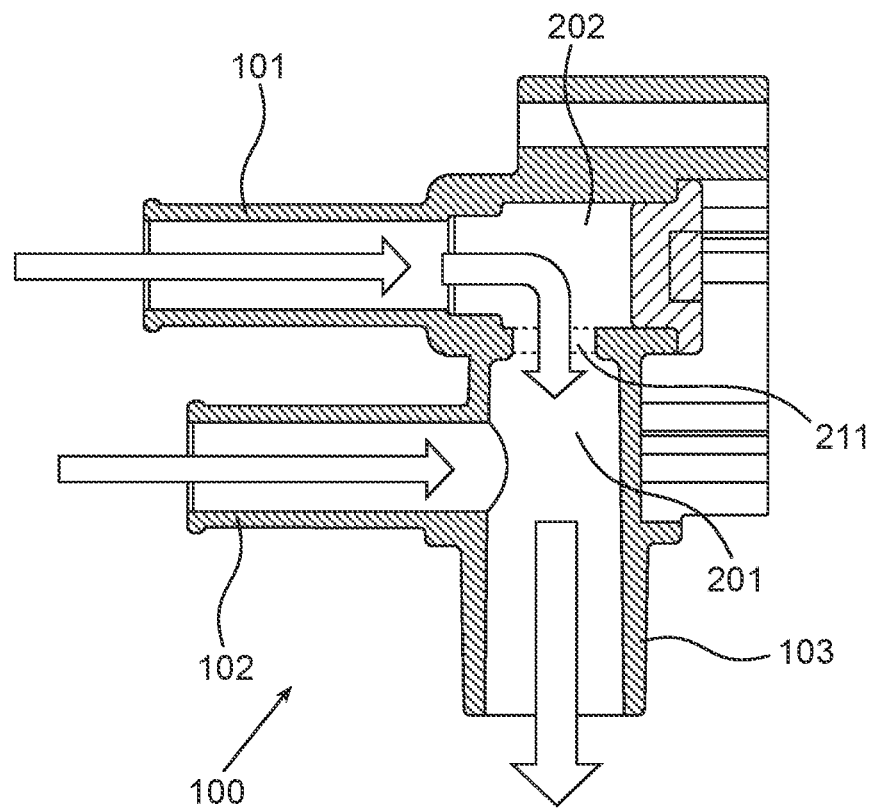
FIG. 1B is a cross sectional view of the embodiment presented in FIG. 1A.

FIG. 1B is a cross section of system 100 presented in FIG. 1A, showing the direction of the flow of matter, e.g., milk (see arrows), from milk tube 102 via chamber 201, which is, at least partially, essentially the inside of tube 103, and from there to the main milk line (not shown). Further, as shown, milk flows from milk tube 101 via chamber 202, which, as detailed herein, according to some embodiments, includes mechanical elements of manifold valve 200 (not shown), to chamber 201, and from there to the main milk line (not shown). As will be shown herein, the pressure in chamber 201 activates manifold valve 200 (not shown), moving it from the closed configuration to the opened configuration, and vice versa. When manifold valve 200 is in the closed configuration passage 211 is blocked such that matter essentially cannot flow from chamber 202 to chamber 201, causing tube 101 to be essentially disconnected from the system. Thus, when manifold valve 200 is in the closed configuration, matter is essentially blocked from flowing from tube 101 to chamber 201 and from there to tube 103 and the main milk line. In contrast, when manifold valve 200 is in the opened configuration, matter may flow from chamber 202 to chamber 201 and from there to the main milk line (not shown).

Figure 2A:
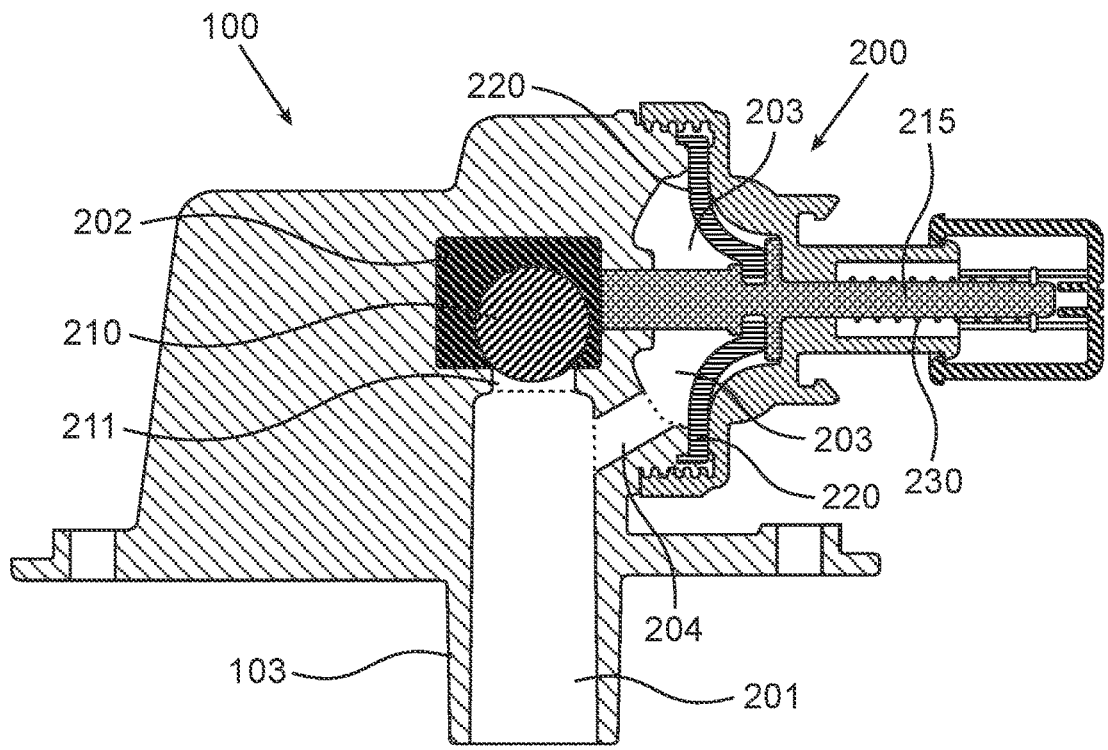
FIG. 2A is a cross sectional view of an embodiment of the invention, when the manifold valve is in the closed configuration.
Figure 2B:
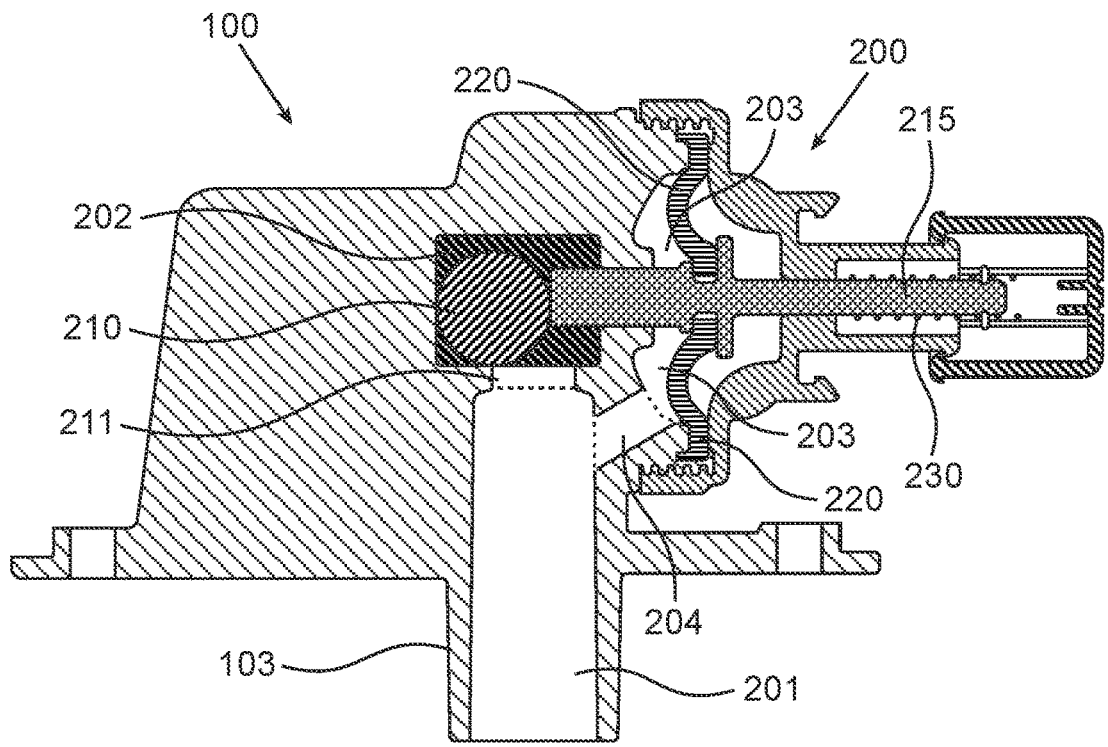
FIG. 2B is a cross sectional view of an embodiment of the invention when the manifold valve is in the opened configuration. It is noted that the view show in FIGS. 2A and 2B is turned about 90 degrees along the central axis, in respect to the views presented in FIGS. 1A and 1B.

Reference is now made to FIGS. 2A and 2B, which are cross-sectional views of system 100 as if looking directly down tubes 101 and 102 (not shown), i.e., a view that is turned about 90 degrees in comparison to the views presented in FIGS. 1A and 1B.

FIG. 2A presents an embodiment of the closed configuration of manifold valve 200. In this closed configuration, as presented in FIG. 2A, ball 210 blocks opening 211, thereby essentially cutting off the passage of matter, e.g., flow of milk, from chamber 202 to chamber 201. As presented in FIG. 2A, system 100 further includes chamber 203, coupled to chamber 201 via tube, chamber, passage, or opening 204. In addition, other than ball 210, manifold valve 200 includes pin or piston 215, coupled to diaphragm 220 and to spring 230. As known to those familiar in the art, milking systems operate using vacuum pressure, thereby allowing the milking operation. The vacuum pressure in various parts of the system may vary over time, e.g., when the teat cup (not shown) connected to tube 102 (not shown) is attached to the teat of the animal, vacuum builds up in chamber 201. Although not detailed herein and not shown in the figures, as known to those familiar in the art, milking systems are operated using vacuum pressure, such that the system herein includes any necessary vacuum inlets/outlets and any other elements necessary for creating the necessary vacuum.

As long as the pressure in chamber 201 remains above a predefined value, i.e., vacuum has not yet build up, manifold valve 200 remains in the closed configuration. As the vacuum rises in chamber 201, it rises in passage 204 and chamber 203 as well, since chambers 201 and 203 are coupled to one another via passage 204 such that air may flow between chambers 201 and 203. When vacuum rises, i.e., when pressure drops, in chamber 203, diaphragm 220 is pulled towards chamber 203, thereby moving pin 215 towards ball 210. Spring 230 is coupled to pin 215 such that the movement of pin 215 towards ball 210 exerts a force on spring 230, causing spring 230 to be compressed. As shown in FIG. 2B, when the vacuum in chamber 203 rises to above a certain value, such that the pressure in chamber 203 is below a predefined pressure, diaphragm 220 is pulled towards chamber 203, thereby moving pin 215 towards ball 210 in a sufficient manner to move ball 210 from opening 211, allowing matter to flow from tube 101 (not shown) to chamber 202, through opening 211 to chamber 201 and from there on into the main milk line (not shown).

After manifold valve 200 is opened, as shown in FIG. 2B, if pressure rises again in chamber 201, e.g., due to disconnection of the teat cup connected to tube 102 (not shown) from the teat, the pressure will be raised in passage 204 and chamber 203 as well. This rise of pressure will cause the force exerted by the vacuum on diaphragm 220 to be decreased, such that spring 230 is extended and relaxed, thereby moving pin 215 away from ball 210 and causing diaphragm 220 to be pulled away from chamber 203. Once the pressure rises above a predefined pressure, the movement of pin 215 away from ball 210 is sufficient for ball 210 to block opening 211, thereby returning manifold valve 200 to its closed configuration, as shown in FIG. 2A.

It is noted that once pin 215 is sufficiently pulled away from the direction of ball 210, such that ball 210 may block opening 211, the movement of ball 210 to block opening 211, may be according to any appropriate means. For instance, ball 210 may be coupled to pin 215, such that when pin 215 moves in one direction, e.g., to the left, ball 210 moves to the left as well, and vice versa, when pin 215 moves to the right, ball 210 moves to the right as well. According to other embodiments, the lower surface of chamber 202 is designed such that ball 210 naturally sits upon opening 211, essentially blocking that opening. For instance, the bottom of chamber 202 may be tapered such that is declines towards opening 211, allowing ball 210 to roll onto opening 211, unless force is exerted on ball 210, moving it away from opening 211. According to this embodiment, pin 215 may exert force of ball 210, moving it from opening 211, when diaphragm 220 is sufficiently pulled into chamber 203 in view of the pressure in chamber 203 dropping below a predefined pressure, as detailed herein.

According to some embodiments, spring 230 is set with a certain preload tension that essentially calibrates the system, essentially determining the predefined operating pressure that causes the valve to be set to the opened or closed configuration. As further detailed hereinbelow, a spring lock, or the like, may be coupled to spring 230, thereby changing the preload tension of spring 230. The tension of spring 230 essentially determines the predefined pressure value, above which manifold valve 200 is closed and below which manifold valve 200 is opened. Particularly, since pin 215 is coupled both to diaphragm 220 and to spring 230, the forces exerted on diaphragm 220 and by spring 230, determine the position of pin 215. Thus, if the force from the low vacuum pressure in chamber 203, which is exerted on diaphragm 220 (and from diaphragm 220 on pin 215) is higher than the counterforce exerted on pin 215 by spring 230, valve 200 is opened, and vice versa, if the force from the vacuum in chamber 203 exerted on diaphragm 220 (and from diaphragm 220 on pin 215) is lower than the counterforce exerted on pin 215 by spring 230, valve 200 is closed. Therefore, the predefined valve operating pressure is defined according to the balance between the force of the spring and the force of the vacuum. The shape and material from which the diaphragm is prepared may also influence the balance of forces and may also, at least partially, define the predefined valve operating pressure.

The type of spring used for spring 230, as well as any permanent pressure exerted thereon, e.g., installment such that spring 230 is partially compressed, may determine the predefined pressure value controlling valve 200. According to some embodiments, the tension of spring 230 may be changed, e.g., by a human operator, an electronic control, and the like, thereby changing the predefined pressure value controlling valve 200. According to such embodiments, valve 200 may be set to be operated at different pressures, according to system requirements and the like. According to some embodiments, spring 230 is coupled to a spring lock (not shown), wherein the spring lock may be set to different positioned along the length of spring 230, thereby determining the tension of spring 230, and in turn determining the predefined pressure operating valve 200.

According to some embodiments, the manifold valve does not include a spring; rather, the diaphragm itself is designed such that the properties of the diaphragm determine the predefined pressure operating valve 200. The material from which the diaphragm is prepared, as well as the shape, size, and thickness thereof, may, at least partially, determine the predefined operating pressure of valve 200. Further, the properties, e.g., diameter, or passage 204 may also, at least partially, determine the predefined operating pressure of valve 200.

It is noted that the use of different types of springs and diaphragms may also influence the predefined operating pressure. It is further noted that while FIGS. 2A and 2B refer to a system comprising ball 210, any other appropriate element may replace ball 210, as long as that element may be moved by pin 215 to open valve 200 and be moved back to cover opening 211, thereby closing valve 200. For instance, pin 215 may be coupled to a covering element, such as a block, sphere, or any other shaped object that may cover opening 211 and be removed therefrom in view of the movement of pin 215, thereby operating valve 200, as detailed herein. Further, pin 215 may be coupled to any type of shutter or cover that may cover opening 211 and be removed therefrom in view of the movement of pin 215, thereby operating valve 200. Further examples could have a single element replacing pin 215 and ball 210, wherein that element would be moved, similarly to pin 215, by the movement of diaphragm 220 and spring 230, and would further include a covering element portion, such that the movement of the single element could cover/uncover opening 211, thereby operating valve 200.

Figure 3:
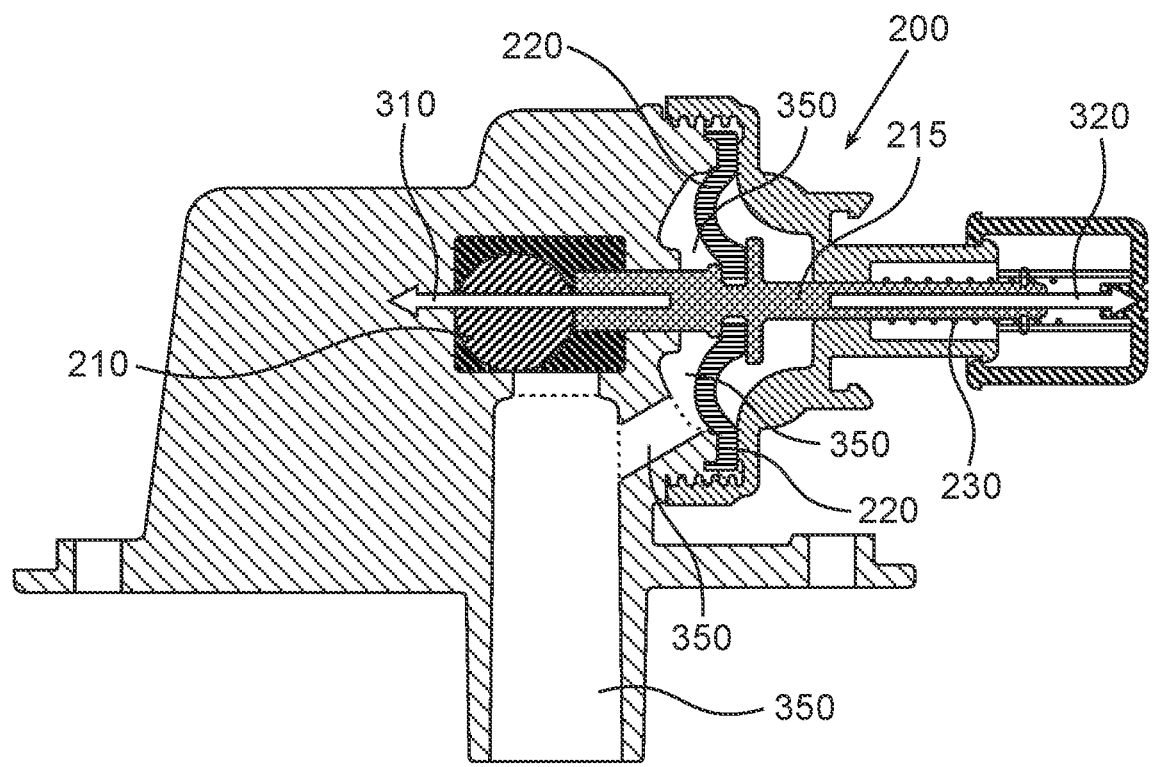
FIG. 3 is a cross sectional view of an embodiment of the manifold valve in the opened configuration, specifically showing the forces causing the mechanical operation of the manifold valve.

According to some embodiments, the manifold valve comprises a pin coupled both to a diaphragm and to a spring, and wherein the diaphragm is further coupled to a vacuum chamber. According to some embodiments, a force is exerted on the diaphragm by the vacuum in the vacuum chamber, while a counterforce is exerted on the pin by the spring. Since the pin is coupled to the diaphragm, the counterforce is, in turn, exerted by the pin, on the diaphragm. Thus, in essence, the force of the vacuum is exerted on the diaphragm in one direction, while the counterforce of the spring is, indirectly (via the pin), exerted on the diaphragm in the opposite direction. Generally, the force and the counterforce are exerted on the diaphragm essentially along (at least about) the same axis, though in (at least about) opposite directions. The pin, which is coupled to the diaphragm is movable along that axis, wherein the direction of movement, and the point at which the pin may be positioned, is determined by the balance between the force and the counterforce. This embodiment is clarified in FIG. 3 presenting a cross-sectional view of an embodiment of the invention. As shown in FIG. 3, manifold valve 200 comprises pin 215 that is coupled both to diaphragm 220 and to spring 230. Diaphragm 220 is further coupled to vacuum chamber 350.

For sake of simplicity vacuum chamber 350 is referred to as a single chamber; however, as presented, e.g., in FIGS. 2A and 2B, the vacuum chamber 350 may be comprised of several regions, e.g., chamber 201, chamber 203 and passage 204. It is noted in this respect that FIGS. 2A and 2B present a particular embodiment of vacuum chamber 350, which may be designed in any other appropriate manner as well.

The vacuum in vacuum chamber 350 exerts force on diaphragm 220, which, since coupled to pin 215, in turn exerts force 310 on pin 215. Further, spring 230 exerts counterforce 320 on pin 215. The balance between force 310 and counterforce 320 determines the position of pin 215 at any given moment. If there are no force changes, once equilibrium is reached, pin 215 will assume a specific position and remain there in view of the balance between force 310 and counterforce 320. Any change in the force or counterforce, e.g., change in pressure in vacuum chamber 350, will change the balance between force 310 and counterforce 320 and accordingly, the position of pin 215 will change as well. For instance, if air enters vacuum chamber 350, raising the pressure, 310 force, exerted by the vacuum, will be reduced, causing pin 215 to move in the direction of counterforce 320. When vacuum is resumed in vacuum chamber 350, force 310 will be increased, causing pin 215 to move in the direction of force 310. Changes in spring 230, e.g., by externally compressing or extending spring 230, or assembling manifold valve 200 with a spring of different force, cause a change in counterforce 320. Spring 230 may be a variable stiffness spring, e.g., wherein the resistance of the spring to load (forces exerted on the spring) may be dynamically varied, e.g., by a control system, the turn of an element coupled to the spring, such as a screw or spring lock, and the like. According to some embodiments, spring 230 may be a compression spring, an extension spring, a reset spring, or any appropriate spring known in the art.

Since pin 215 is coupled to any appropriate type of covering element (or is replaced by a single element comprising a pin portion and a covering portion), e.g., ball 210, the movement of pin 215, along the axis of force 310 and counterforce 320, determines whether manifold valve 200 is in the closed or opened position, as detailed herein.

Figure 4A:
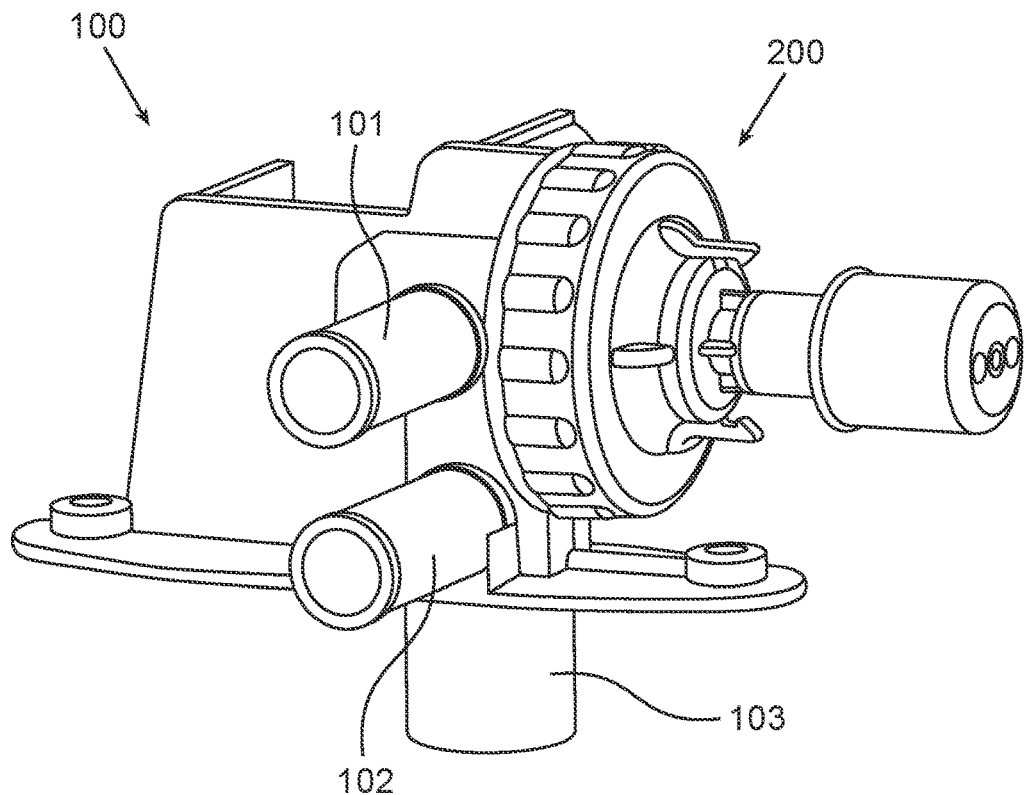
Figure 4B:
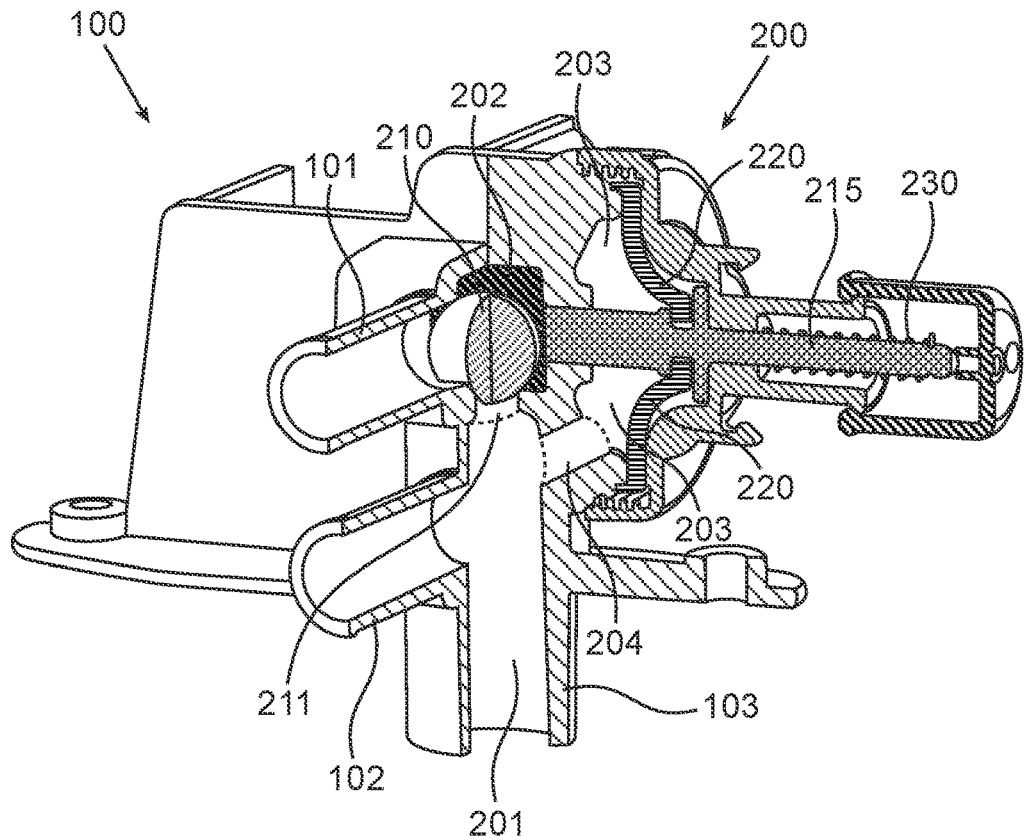

Reference is now made to FIGS. 4A and 4B showing an approximately 45 degree view of system 100, in respect to the systems presented in FIGS. 1A, 1B, 2A, 2B and 3, including manifold valve 200, wherein FIG. 4A presents the outside view of the system, and FIG. 4B presents a partial cross sectional view. It is noted that FIGS. 1A and 1B are approximately 90 degrees view in respect to FIGS. 2A, 2B and 3, and FIGS. 4A and 4B are a view that is about 45 degrees from each of FIGS. 1A, 1B, 2A, 2B and 3 (counterclockwise from FIGS. 1A and 1B, and clockwise from FIGS. 2A, 2B and 3).

FIG. 4A presents a view of system 100, including manifold valve 200, milk tubes 101 and 102, through which milk enters system 100 from two separate teat cups (not shown), as well as tube 103, through which milk flows from milk tubes 101 and 102, via manifold valve 200, to the main milk line (not shown). The cross-sectional view of FIG. 4B clearly shows milk tube 102, leading to chamber 201, from where milk flows via tube 103 (chamber 201) to the main milk line (not shown). Further, milk tube 101 leads to chamber 202. In order for milk to flow from chamber 202 view tube 103 (chamber 201) to the main milk line, ball 210 must be "pushed aside" by piston 215, thereby leaving opening 211 opened and clear for milk flow (this is the opened configuration of valve 200). If the pressure rises in chamber 201, this may indicate that air (and contaminations) are entering the system, and therefore, it should be "cut off" from the main milk line. Thus, as detailed herein, when the pressure in chamber 201 rises above a certain predefined value, pin 215 is moved in the direction of spring 230, allowing ball 210 to drop and cover opening 211, thereby essentially blocking the flow of matter from tube 101, via chamber 202, to the main milk line. It is noted that a shutter, or the like, may be installed, e.g., in tube 102 or in chamber 201, in order to block the entrance of milk from tube 102 to the main milk line via tube 103 (chamber 201). Such a shutter (or any other appropriate element) may be operated by any means, such as sensors, and the like.

It is noted that while the embodiments depicted in FIGS. 1A, 1B, 2A, 2B, 3, 4A and 4B show the pressure in one chamber (201) operating valve 200, such that flow is stopped from one tube (101) into the system, further embodiments may be contemplated. For instance, any number of tubes connected to system 100 above tube 101 may also be activated by the operation of valve 200.

Figure 5A:
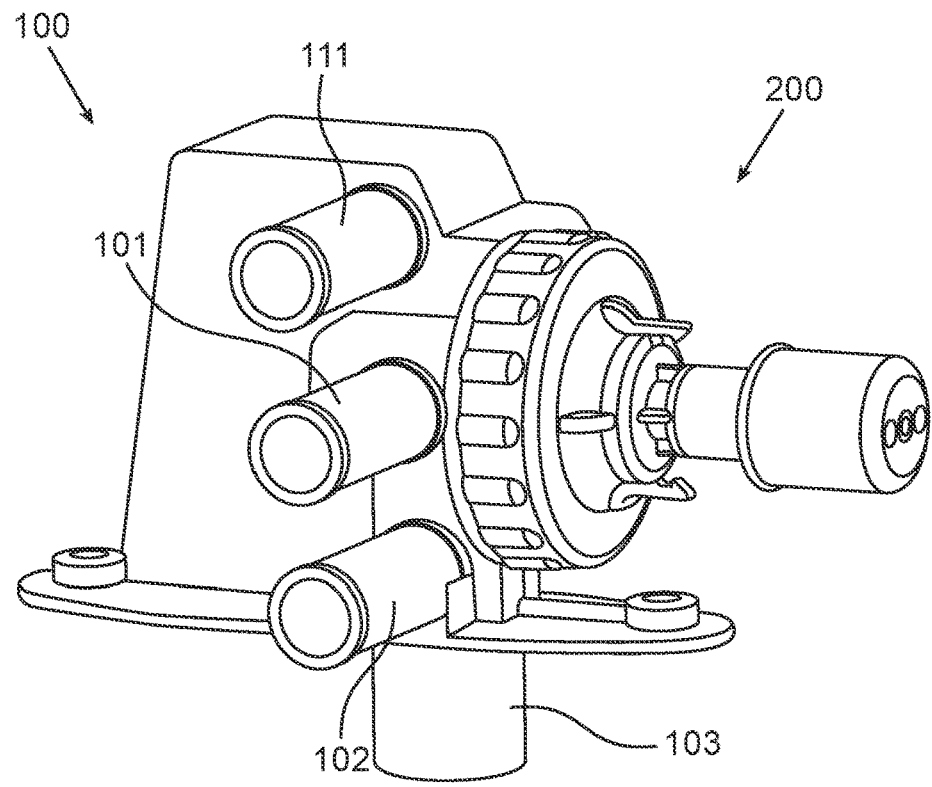
FIGS. 5A and 5B present an embodiment in a similar perspective to the perspective of FIGS. 4A and 4B, wherein the embodiment presented in FIGS. 5A and 5B includes two teat cups in the second group of teat cups (in contrast to one in FIGS. 1A, 1B, 2A, 2B, 3, 4A and 4B), and one teat cup in the first group of teat cups.
Figure 5B:
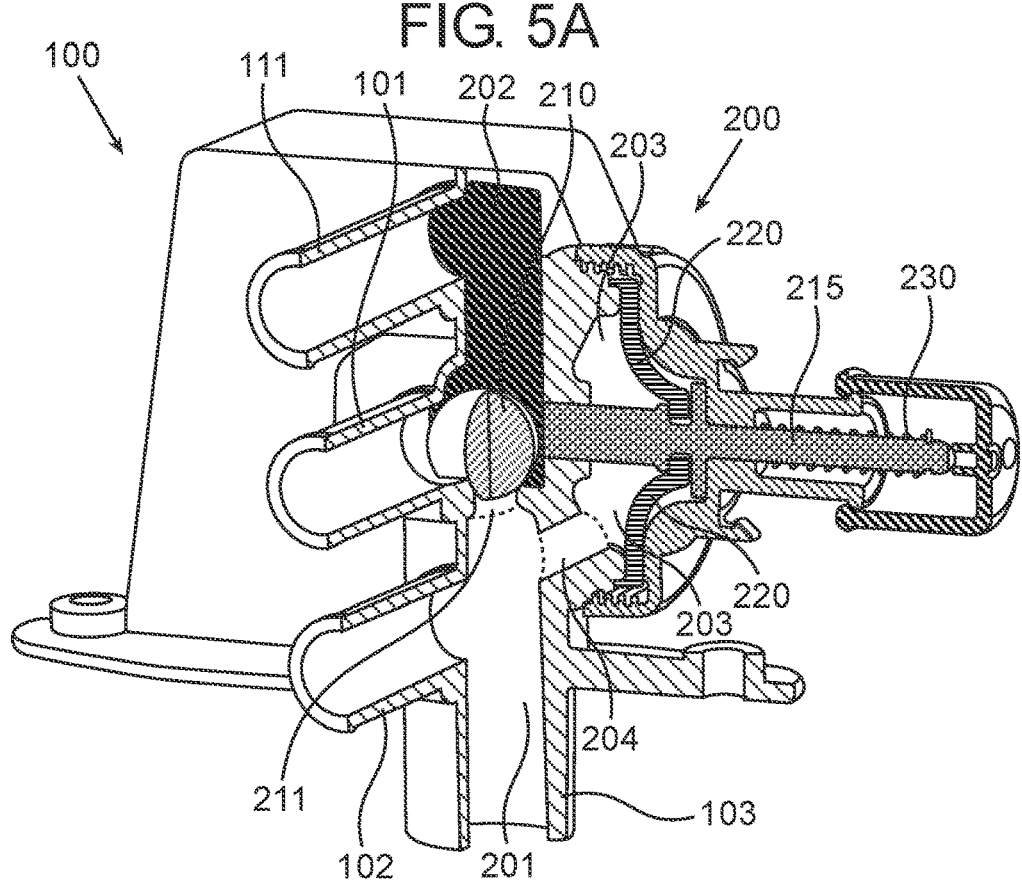

FIGS. 5A and 5B are similar in the perspective they present to FIGS. 4A and 4B, respectively; however, the embodiment of system 100 presented in FIGS. 5A and 5B includes two teat cups in the second group of teat cups and one teat cup in the first group of teat cups. While the teat cups themselves are not shown in FIGS. 5A and 5B, the tubes leading from those teat cups to manifold valve 200 are presented. Namely, milk tube 102, belonging to the first group of teat cups, leads from a teat cup (not shown) to chamber 201, from where milk flows via tube 103 (chamber 201) to the main milk line (not shown). Further, milk tube 101 and milk tube 111, both belonging to the second group of teat cups, lead, each from one teat cup (not shown) to chamber 202. It is noted in this respect that while FIG. 5B presents both milk tubes 101 and 111 are leading milk to a single chamber, namely chamber 202, it is possible that each one of milk tubes 101 and 111 lead to a separate chamber, such that the flow from each of those separate chambers to the main milk line is controlled by manifold valve 200 or by any other appropriate manifold valve embodiment that is closed and opened according to the pressure in the first group of teat cups, as detailed herein.

Similarly to the embodiment presented in FIG. 4B, in order for milk to flow from chamber 202 view tube 103 (chamber 201) to the main milk line, ball 210 must be "pushed aside" by piston 215, thereby leaving opening 211 opened and clear for milk flow (this is the opened configuration of valve 200). If the pressure rises in chamber 201, this may indicate that air (and contaminations) are entering the system, and therefore, it should be "cut off" from the main milk line. Thus, as detailed herein, when the pressure in chamber 201 rises above a certain predefined value, pin 215 is moved in the direction of spring 230, allowing ball 210 to drop and cover opening 211, thereby essentially blocking the flow of matter from tubes 101 and 111, via chamber 202, to the main milk line.

Since milk from both milk tube 101 and milk tube 111 flows into chamber 202, the pressure in chamber 201 essentially controls the flow from both milk tubes 101 and 111 via chamber 202, and from there to chamber 201 and the main milk line.

Further, it is noted that the pressure in chamber 201 is mainly dependent on the pressure in the first group of teat cups (in the presented embodiments—the teat cup (not shown) connected to milk tube 102), such that essentially, the pressure in the first group of teat cups, e.g., the teat cup connected to milk tube 102, controls the flow from the second group of teat cups, namely the teat cups connected to milk tube 101 and milk tube 111. Therefore, if, for instance, the teat cup connected to milk tube 102 is not yet connected to, or becomes even partially disconnected from the animal's teat, the pressure in chamber 201 may be above the predefined value, causing manifold valve 200 to be in the closed configuration and not allowing milk to flow from tubes 101 and/or 111 into the main milk line.

While not presented in the Figures, the first group of teat cups may also include two or more teat cups, such that more than one tube (102) will lead to chamber 201, e.g., new tube 122, not presented. In such an embodiment, the pressure in both, or either one of, the tubes leading to chamber 201, e.g., tube 102 and tube 122 (not presented) controls the operation of manifold valve 200, and therefore controls the flow of milk from the first group of teat cups, e.g., the teat cup connected to milk tube 101 and, if existent, as in FIGS. 5A and 5B, the teat cup connected to milk tube 111. It is further noted that each one of the tubes leading from the teat cups in the first group of teat cups may lead to a separate chamber, wherein the pressure in each of those chambers operates manifold valve 200, as similarly described for chamber 201.

Unless explicitly stated, the method embodiments described herein are not constrained to a particular order or sequence. Additionally, some of the described method embodiments or elements thereof can occur or be performed simultaneously, at the same point in time, or concurrently.

While certain features of the invention have been illustrated and described herein, many modifications, substitutions, changes, and equivalents may occur to those skilled in the art. It is, therefore, to be understood that the appended claims are intended to cover all such modifications and changes as fall within the true spirit of the invention.

What is claimed is:

1. An automatic mechanical manifold valve having an opened configuration and a closed configuration,
    wherein said automatic mechanical manifold valve is coupled to a first group of teat cups and to a second group of teat cups; and
    wherein the first group of teat cups and the second group of teat cups are each coupled to:
        a main milk line; and
        a vacuum system creating pressure in each of the teat cups of the first group of teat cups and in each of the teat cups of the second group of teat cups; and
    wherein the first group of teat cups and the second group of teat cups are operatively distinct from one another in that:
    (a) the first group of teat cups, but not the second group of teat cups, operatively determines the configuration of the manifold valve, such that the manifold valve is set:
        to the closed configuration when the pressure in the first group of teat cups is above a predefined pressure value; or
        to the opened configuration when the pressure in the first group of teat cups is below said predefined pressure value; and
    wherein
    (b) the second group of teat cups, but not the first group of teat cups, is operatively connected to, or disconnected from, the main milk line according to the configuration of the manifold valve, such that:
        when the manifold valve is in the closed configuration, the second group of teat cups is essentially disconnected from the main milk line, such that matter cannot flow from the teat cups of the second group of teat cups into the main milk line; and
        when the manifold valve is in the opened configuration, the second group of teat cups is essentially connected to the main milk line, allowing the flow of milk from the teat cups of the second group of teat cups to the main milk line.

2. The automatic mechanical manifold valve according to claim 1, wherein
    the first group of teat cups comprises one teat cup;
    the second group of teat cups comprises one teat cup; or
    each of the first group of teat cups and the second group of teat cups comprises one teat cup.

3. The automatic mechanical manifold valve according to claim 1, said automatic mechanical manifold valve comprising:
    a spring;
    a diaphragm;
    a pin;
    a covering element; and
    a vacuum chamber;
    wherein
        said pin is coupled to said spring, said diaphragm and said covering element;
        said diaphragm is further coupled to said vacuum chamber;

and wherein in the closed configuration said covering element covers a passage to the main milk line and wherein in the opened configuration said covering element at least partially does not cover said passage to said main milk line.

4. The automatic mechanical manifold valve according to claim 3, wherein said pin and said covering element are combined in a single pin-covering element.

5. The automatic mechanical manifold valve according to claim 3, wherein the spring has a tension that is adjustable.

6. The automatic mechanical manifold valve according to claim 3, wherein a vacuum in said vacuum chamber exerts a force on said diaphragm, and wherein said spring exerts a counterforce on said pin, which, in turn exerts said counterforce on said diaphragm, such that a balance between said force and said counterforce determines the position of said pin, which in turn determines the position of said covering element in respect to said passage to said main milk line.

7. The automatic mechanical manifold valve according to claim 3, wherein said covering element is a ball-shaped element, a sphere-shaped element, block-shaped element, or a shutter.

8. The automatic mechanical manifold valve according to claim 1, wherein the predefined pressure value is variable and wherein the predefined pressure value is varied mechanically or electronically.

9. A teat cup assembly comprising a first group of teat of teat cups, a second group of teat cups, and an automatic mechanical manifold valve,
  wherein said automatic mechanical manifold valve has a closed configuration and an opened configuration, and wherein the first group of teat cups and the second group of teat cups are operatively distinct from one another in that:
  (a) wherein a pressure in said first group of teat cups, or in a chamber coupled to said first group of teat cups, but not the second group of teat cups, controls said automatic mechanical manifold valve, determining whether said automatic mechanical manifold valve is in the closed configuration or the opened configuration; and
  (b) wherein said automatic mechanical manifold valve controls flow from said second group of teat cups, but not said first group of teat cups, to a main milk line, such that in the closed configuration the flow from said second group of teat cups to said main milk line is essentially blocked, while in the opened configuration the flow from said second group of teat cups to said main milk line is essentially free.

10. The teat cup assembly according to claim 9, wherein said automatic mechanical manifold valve is
  in the closed configuration when said pressure is above a predefined pressure value; and
  in the opened configuration when said pressure is below a predefined pressure value.

11. The teat cup assembly according to claim 9, wherein
  the first group of teat cups comprises one teat cup
  the second group of teat cups comprises one teat cup; or
  each of the first group of teat cups and the second group of teat cups comprises one teat cup.

12. The teat cup assembly according to claim 9, wherein said automatic mechanical manifold valve comprises:
  a spring;
  a diaphragm;
  a pin;
  a covering element; and
  a vacuum chamber;
  wherein
    said pin is coupled to said spring, said diaphragm and said covering element;
    said diaphragm is further coupled to said vacuum chamber;
  and wherein in the closed configuration said covering element covers a passage to the main milk line and wherein in the opened configuration said covering element at least partially does not cover said passage to said main milk line.

13. The teat cup assembly according to claim 12, wherein said pin and said covering element are combined in a single pin-covering element.

14. The teat cup assembly according to claim 12, wherein
  the tension of said spring is adjustable;
  the predefined pressure value is variable; or
  both the tension of the spring and the predefined pressure value are variable.

15. The teat cup assembly according to claim 12, wherein said covering element is a ball-shaped element, a sphere-shaped element, block-shaped element, or a shutter.

16. A method for controlling milk flow from a second group of teat cups to a main milk line, but not a first group of teat cups, via an automatic mechanical manifold valve, by a pressure in the first group of teat cups, but not the second group of teat cups, or in a vacuum chamber coupled to said first group of teat cups, but not the second group of teat cups,
  wherein the first group of teat cups and the second group of teat cups are operatively distinct from one another in that (a) the milk flow in the second group of teat cups, but not the first group of teat cups, is controlled by the automatic mechanical manifold valve; and (b) the configuration of the automatic mechanical manifold valve is controlled by the pressure in the first group of teat cups, but not the second group of teat cups, or in a vacuum chamber coupled to the first group of teat cups, but not the second group of teat cups;
  wherein when said pressure is above a predefined pressure value, said automatic mechanical manifold valve is in a closed configuration, such that matter is essentially blocked from flowing from said second group of teat cups to said main milk line; and
  wherein when said pressure is below a predefined pressure value, said automatic mechanical manifold valve is in an opened configuration, such that matter is essentially free to flow from said second group of teat cups to said main milk line.

17. The method according to claim 16, wherein
  said first group of teat cups comprises one teat cup;
  said second group of teat cups comprises one teat cup; or
  each of the first group of teat cups and the second group of teat cups comprises one teat cup.

18. The method according to claim 17, wherein said automatic mechanical manifold valve comprises:
  a spring;
  a diaphragm;
  a pin;
  a covering element; and
  a vacuum chamber;
  wherein
    said pin is coupled to said spring, said diaphragm and said covering element;
    said diaphragm is further coupled to said vacuum chamber;
  and wherein in the closed configuration said covering element covers a passage to the main milk line and wherein in the opened configuration said covering element at least partially does not cover said passage to said main milk line.

19. The method according to claim 18, wherein a vacuum in said vacuum chamber exerts a force on said diaphragm, and wherein said spring exerts a counterforce on said pin, which, in turn exerts said counterforce on said diaphragm, such that a balance between said force and said counterforce determines the movement and final position of said pin, which in turn determines the position of said covering element in respect to said passage to said main milk line.

* * * * *